No. 860,711. PATENTED JULY 23, 1907.
W. W. VOSPER.
PIPE CUTTER.
APPLICATION FILED FEB. 2, 1906.
2 SHEETS—SHEET 2.
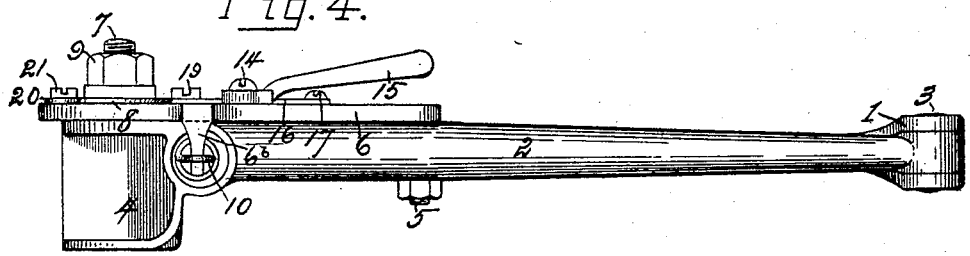
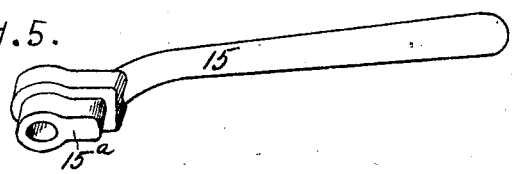
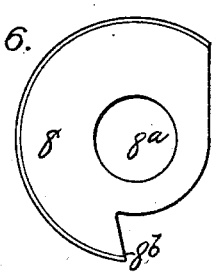
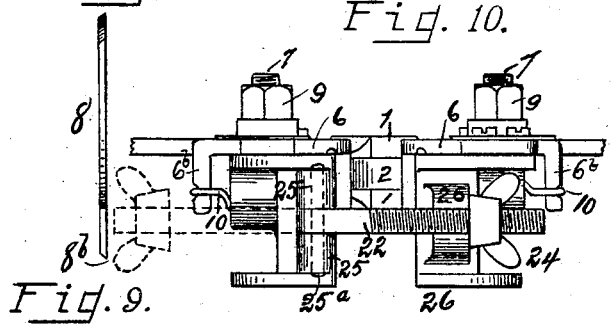
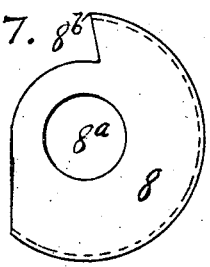
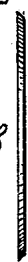
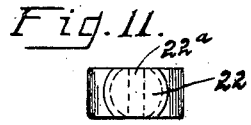
WITNESSES:
D. C. Walter
C. H. Clement
INVENTOR.
William Vosper,
J. Simon Hall, Atty.

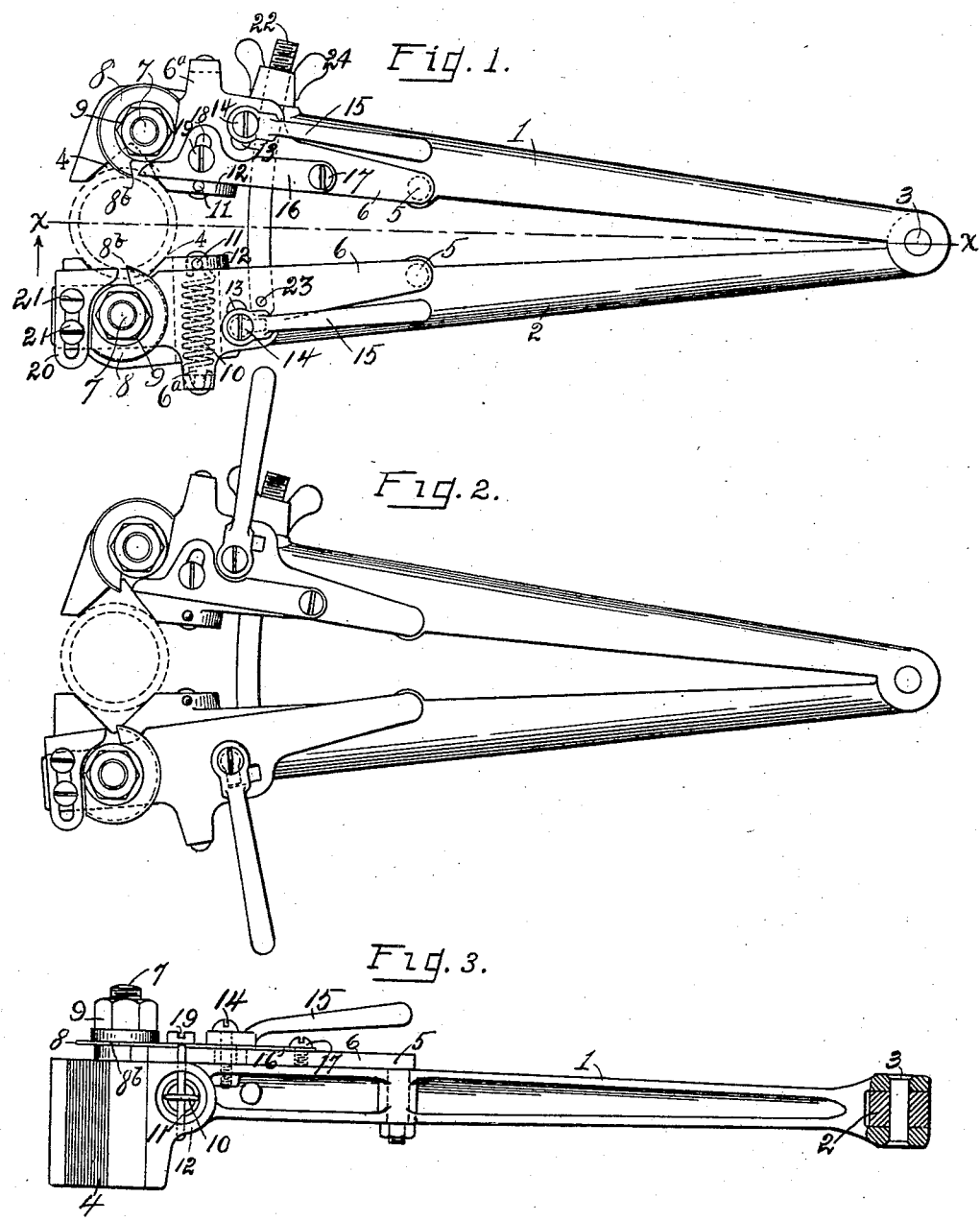

UNITED STATES PATENT OFFICE.

WILLIAM W. VOSPER, OF SANDUSKY, OHIO.

PIPE-CUTTER.

No. 860,711.   Specification of Letters Patent.   Patented July 23, 1907.

Application filed February 2, 1906. Serial No. 299,122.

*To all whom it may concern:*

Be it known that I, WILLIAM W. VOSPER, a citizen of the United States, residing at Sandusky, in the county of Erie and State of Ohio, have invented certain new and useful Improvements in Pipe-Cutters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to and its object is to furnish a tool for cutting off pipes, which tool shall be light, strong, durable and efficient. I attain these objects by means of the devices and arrangement of parts hereinafter described and shown, and illustrated in the accompanying drawings, in which,—

Figure 1 is a side elevation of my device showing the cutters in engagement with a pipe in the act of cutting the pipe; Fig. 2, the same showing the tool engaged with a pipe, but with the cutters thrown out of cutting position; Fig. 3, a central sectional elevation taken on line $x$—$x$ Fig. 1; Fig. 4, a plan-view seen from the bottom in Fig. 1; Fig. 5, one of the cam-levers hereinafter referred to, detached; Figs. 6 and 7, plan-views of the pair of cutters hereinafter referred to; Figs. 8 and 9, edge-views of the same; Fig. 10, an end-view of my cutting tool showing a modified form of the arrangement of the clamping screw hereinafter referred to, and Fig. 11, an end-view of said modified clamping screw detached.

Like numerals of reference indicate like parts throughout the drawings.

In the drawings, 1 and 2 are a pair of tong-arms pivotally connected at one end, as at 3, and having in their meeting faces at their other end coincident rectangular recesses 4 which, when the adjacent faces of the tongs are brought together, form a rectangular opening through the tong-arms. Upon one side of each of the tong-arms is pivoted, at one end, as at 5, a flat bar 6, these two bars being adapted to swing upon their pivots in the same plane. The bars 6—6 each carry a threaded stud-bolt 7.

8—8 are mutilated disk cutters (see Figs. 6 and 7,) each having a central opening $8^a$ which slips over stud-bolt 7. Clamping nuts 9 upon the threaded stud-bolts clamp and hold the cutting disks in place in cutting position. It will be understood that the disks 8 lie in the same plane and that their cutting corners $8^b$ cut in the same circumferential channel in the surface of the pipe to be cut off. It will also be seen by reference to Figs. 6 to 9, inclusive, that the two cutting edges of these disks are oppositely beveled to form two cutting corners which cut at opposite sides of the channel formed by the cutters as the work proceeds. The advantages of this arrangement are that two narrow shavings are taken by the cutters at opposite sides of the cut instead of broad shavings, thus expediting the work and overcoming the common difficulty encountered in work of this character due to the broad cut with its heavy shavings choking the work and frequently breaking the tools.

Each of the flat bars 6 has an arm $6^a$ extending outwardly in the same plane with the bar, this arm being bent at a right angle, as at $6^b$, (see Fig. 4,) backwardly over the tong-arm. To the extremity of this arm is secured one end of a stout spiral spring 10 (see dotted lines Fig. 1,) which extends through a hole in the tong-arm and which engages at its opposite end a pin 11 passing through a lug 12 on the inner face of the tong-arm. It will be seen that the springs 10 pull the plates 6 with their cutting disks powerfully toward each other. The projecting extremity of the pin 11 forms a stop which limits the inward movement of the plate 6.

Through each of the plates 6 is an irregular opening 13 through which passes a pivot screw 14 engaged at its inner end with the tong-arm and carrying at its outer end a cam-lever 15. Upon the inner face of this cam-lever is a lug $15^a$ (see Fig. 5,) which engages the irregular opening 13 so that the swing of the lever 15 on its fulcrum will, through the lug $15^a$ and the opening 13, cause the plate 6 to swing upon its pivot 5. Since the two cutters 8—8 cut on opposite sides of the pipe, the two cutting corners of these disks are turned in opposite directions. (See Figs. 1 and 2.)

To limit the depth of the cut of the cutters and to thereby prevent breakage I provide a guide or stop which moves directly in advance of the cutting portion of the cutting disk. This guide or stop consists of a thin plate 16 pivoted at one end, as at 17, upon one of the plates 6, the opposite end being movable close to and directly in advance of its cutting tool 8.

Through the plate 16 is a slot 18 through which projects into the plate 6 a set-screw 19. This slot and set-screw permit any desired adjustment of the guide or stop 16. The corresponding guide or stop upon the other tong-arm consists of a thin plate 20 having a slot therethrough. Through the slot into the plate 6, near its end, passes one or more set-screws 21 which permit the adjustment of this plate so that its inner margin, which lies directly in the path of the cutting disk, may be adjusted as may be desired. It will be seen that the plates 16 and 20, resting in the circumferential channel as it is cut, and moving directly in advance of the cutting portions of the cutting disks, may be adjusted so that the cut of the disks will be regulated to any desired depth.

In Figs. 1 and 2, I have shown a threaded bolt 22 pivoted, as at 23, upon one of the tong-arms and passing through the opposite tong-arm and provided with a thumb-nut 24.

The operation of my device, thus far described, is as follows: The thumb-nut is removed or loosened sufficiently to permit the rectangular opening 8 to embrace the pipe at the point where the cut is to be made. The levers 15 are thrown outwardly, as in Fig. 2, so that the cutting disks will clear the surface of the pipe to be cut. Now the rectangular opening is engaged with the pipe at the proper place and the thumb-nut 24 is tightened up so that the two jaws of the tongs will clasp the pipe,—indicated in Figs. 1 and 2 by dotted lines. The clasp of the jaws upon the pipe is just sufficient to hold the tool steady upon the work, but not sufficient to interfere with the swing of the tool around the pipe which is held stationary in a vise or otherwise. Now the levers 15 are swung inwardly permitting the plates 6 to be pulled by their springs toward each other, bringing the cutting corners 8$^b$ of the disks into engagement with the surface of the pipe to be cut, with the full force of the coiled springs 10. Now the tool is swung around the stationary pipe, the cutting corners operating successively to rapidly remove thin narrow shavings, the springs holding the cutters to their work until the pipe is cut through. During this operation the guides or stops 16—20 prevent the cutting corners of the cutting disks from taking too deep hold upon the metal and, being in the same plane with and in advance of the cutters, the guides direct the cutting operation in the proper plane, thus preventing breakage or twisting of the cutters and insuring smooth even work.

In Fig. 10, I have shown the bolt 22 as pivoted to the forward extremity of one of the tong-arms between two lugs 25. The corresponding extremity of the other tong-arm is provided with a corresponding pair of lugs 26. Through the two lugs 25 and through the flattened end of the bolt 22 are corresponding holes for the reception of a pin which forms a pivot upon which the bolt may be swung into and out of engagement with the lugs 26. The sides of the threaded extremity of the bolt in this case are flat, as at 22$^a$, (see Fig. 11,) and fit closely between the lugs 26, the pivot bolt here described carries a thumb-nut 24 of the usual or any preferred form. By this construction it is unnecessary to remove the thumb-nut 24 when engaging the tong-arms with the pipe, it being only necessary to loosen the nut sufficiently to permit the bolt to be swung upon its hinge or pivot 22$^a$ into the position shown by the dotted lines to permit the separation of the jaws of the tong-arms.

Having described my invention, what I claim and desire to secure by Letters Patent is,—

1. In an instrument of the described character, a pair of arms pivoted together at one end, jaws at the other end of the arms adapted to engage a pipe, a plate pivoted on each of said tong-arms, a cutter on each of said plates disposed in a common plane and adapted to engage the surface of a pipe within said jaws, and a spring for each of said plates which holds the plate and its cutter pressed normally inward toward the pipe to be cut.

2. In an instrument of the described character, a pair of tong-arms pivotally secured together at one end and having pipe-jaws at their opposite end, a mutilated disk cutter for each of the arms, and pivotal connections between the cutters and the arms which permit the cutters to swing toward and away from each other in the same plane.

3. In an instrument of the described character, a pair of tong-arms pivotally secured together at one end and having pipe-jaws at their opposite end, a mutilated disk cutter for each of the arms, pivotal connections between the cutters and the arms which permit the cutters to swing toward and away from each other in the same plane, and means for clamping the jaws upon a pipe.

4. In an instrument of the described character, a pair of tong-arms pivotally secured together at one end and having pipe-jaws at their opposite end, a mutilated disk cutter for each of the arms, pivotal connections between the cutters and the arms which permit the cutters to swing toward and away from each other in the same plane, and springs for pressing said cutters normally inwardly toward each other.

5. In an instrument of the described character, a pair of arms pivotally connected at one end, a pair of pipe-jaws on said arms, a plate pivoted on each of said arms, a cutter upon each of said plates, said pair of cutters being adapted to cut in the same plane, guides for said cutters which limit the depth of their cut, and means for holding said cutters pressed inwardly toward each other.

6. In an instrument of the described character, a pair of arms pivotally connected at one end, a pair of pipe-jaws on said arms, a plate pivoted on each of said arms, a cutter upon each of said plates, said pair of cutters being adapted to cut in the same plane, means for holding said cutters pressed inwardly toward each other, on each of said arms a lever fulcrumed upon the arm and engaged with the plate on said arm and adapted to throw the cutters into and out of operative position.

7. In an instrument of the described character, a pair of arms pivotally connected at one end, a pair of pipe-jaws on said arms, a plate pivoted on each of said arms, a cutter upon each of said plates, said pair of cutters being adapted to cut in the same plane, adjustable guides for said cutters which limit the depth of their cut, means for holding said cutters pressed inwardly toward each other, on each of said arms a lever fulcrumed upon the arm and engaged with the plate on said arm and adapted to throw the cutters into and out of operative position.

8. In an instrument of the described character, a pair of arms pivotally connected at one end, a pair of pipe-jaws on said arms, a pair of cutters on said arms adapted to cut in the same plane, means for holding the cutters normally pressed inwardly toward each other, a clamping bolt pivoted upon the end of one of said arms opposite its pivoted end, means upon the end of the other arm for engaging said clamping bolt, and a clamping nut upon said bolt.

9. In an instrument of the described character, a pair of opposed cutters having transversely oppositely beveled cutting edges disposed in different planes, and a pair of pivotally connected supports for said cutters arranged to permit the swing of said cutters in a common plane.

10. In an instrument of the described character, a pair of opposed cutters having transversely oppositely beveled cutting edges disposed in different planes, and supports for said cutters arranged to permit the movement of said cutters toward and from each other in a common plane.

In testimony whereof I affix my signature in presence of two witnesses.

WILLIAM W. VOSPER.

Witnesses:
CHARLES G. SCHIPPEL,
H. W. PARSONS.